ved Sept. 24, 1974

3,838,073
POLY(FLUOROALKOXYPHOSPHAZENE) HOMOPOLYMERS

Selwyn H. Rose, Beachwood, and Kennard A. Reynard, Mentor, Ohio, assignors to Horizons Incorporated, a Division of Horizons Research Incorporated
No Drawing. Filed Aug. 28, 1972, Ser. No. 284,200
Int. Cl. C08g 33/16, 33/02
U.S. Cl. 260—2 P  8 Claims

ABSTRACT OF THE DISCLOSURE

Poly(fluoroalkoxyphosphazene) polymers in which each substituent bonded to the phosphorus atoms contains four to twelve carbon atoms are claimed. The polymers are prepared from poly(dichlorophosphazene) and a fluoroalkoxide salt. The polymers are plastics with exceptional solvent and chemical resistance and are useful as coatings and films.

---

This invention relates to poly(fluoroalkoxyphosphazene) polymers. More specifically, it relates to polymers which may be represented by the formula:

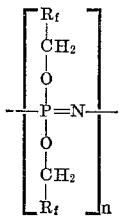

wherein $n$ is a number from about 50 to 50,000 and $R_f$ represents a perfluoroalkyl radical which may be either linear or branched and wherein there are from 4 to 12 carbon atoms in each $R_fCH_2O-$ group and all carbon atoms in the $R_f$ group are fully fluorinated.

The polymers of this invention are plastics and exhibit outstanding stability to solvents, chemicals and water. This combination of properties makes them particularly useful in film, coating, and structural applications where high environmental resistance is desired.

The preparation of the $[(CF_3CH_2O)_2PN]_n$ polymer is described in U.S. Pat. 3,370,020 issued Feb. 20, 1968, and in Inorg. Chem., 5, 1719 (1966). The $$[(C_2F_5CH_2O)_2PN]_n$$

polymer also is mentioned in U.S. Pat. 3,370,020. These polymers contain fewer than four carbon atoms in the substituent groups and exhibit vastly different solvent resistances than the polymer described herein. The known $[(CF_3CH_2O)_2PN]_n$ and $[(C_2F_5CH_2O)_2PN]_n$ polymers are soluble in acetone and Freon TA ($CCl_2FCF_2Cl$/acetone azeotrope). The $[(CF_3CH_2O)_2PN]_n$ polymer is soluble in many common solvents such as tetrahydrofuran, ethyl acetate and methyl ethyl ketone. Both polymers are highly swollen in ethanol but are insoluble in Freon E-1 ($CF_3CF_2CF_2OCHFCF_3$).

In marked contrast to the observed solubilities of these known polymers it has been unexpectedly found that the polymers of this invention are insoluble in common organic solvents and in acetone or Freon TA, and that they are unaffected by ethanol but are soluble in Freon E-1. Their solubility in the latter solvent decreases as the length of the $R_f$ group increases. Therefore, the polymers of this invention exhibit much greater solvent resistance than the poly(fluoroalkoxyphosphazene) homopolymers described in the prior art. This property makes them highly useful as coatings which are resistant to solvents and chemicals.

The polymers of this invention are made by known methods, such as those described in U.S. Pats. 3,370,020 and 3,515,688. An alkoxide solution is prepared from an alkali metal and a fluoroalcohol in an organic solvent such as tetrahydrofuran, dioxane or the methyl ethers of polyethylene glycol at temperatures from below room temperature to reflux. Poly(dichlorophosphazene) is dissolved in a suitable solvent such as benzene, toluene or a chlorinated benzene or in a suitable solvent mixture. The solution is added to at least two equivalents of the alkali salt of a 1,1-dihydroperfluoroalcohol of formula $R_fCH_2OH$ at temperatures from below room temperature to reflux temperature so that essentially complete substitution of chlorine in the poly(dichlorophosphazene) is achieved. Reaction temperatures during substitution are 20° to 200° C. and reaction times of from less than one hour up to one hundred hours generally are employed. The resulting homopolymer is washed free of inorganic salt and purified by solution or swelling in Freon E-1 followed by exhaustive treatment with water.

The polymers of this invention can be used to form films, coatings and the like by known coating, spraying or molding techniques. The polymers are insoluble in Freon TA, Freon E-2 and in all common solvents such as water, acetone, alcohols, benzene, hexane, chloroform, ethyl acetate, and tetrahydrofuran. They are unaffected by immersion in cold concentrated sulfuric acid, cold 40% aqueous potassium hydroxide and in boiling water.

This invention will be more fully understood by reference to the following illustrative examples which are not intended to limit the scope of this invention.

EXAMPLE 1

Preparation of 

A solution of $[Cl_2PN]_n$ polymer (20.9 g., 0.188 mole) in 450 ml. benzene was added over 0.5 hour to a solution of sodium heptafluorobutoxide at reflux. The alkoxide solution was prepared at ambient temperature under a nitrogen atmosphere from 55 ml. (86.4 g., 0.432 mole) 2,2,3,3,4,4,4-n-heptafluorobutanol, 400 ml. dry tetrahydrofuran and sodium (9.1 g., 0.396 mole). The reaction mixture was refluxed 16 hours, cooled and filtered. The insoluble material was washed with tetrahydrofuran and then with water until the washes were free of chloride ion. The polymer was dissolved in 800 ml. of Freon E-1, washed with water, and precipitated into 1.6 liters of benzene-acetone (1 v./1 v.). The white powder (41.6 g.) had an intrinsic viscosity of 3.3 dl./g. in Freon E-1 at 28° C. Calcd. for $[(n-C_3F_7CH_2O)_2PN]_n$: C, 21.7; H, 0.9; N, 3.2; F, 60.1; Cl, 0.0. Found: C, 21.6; H, 1.0; N, 3.4; F, 59.9; Cl, <0.015. The polymer is insoluble in Freon E-2, Freon TA, acetone, ethanol and acetonitrile, but is soluble in Freon E-1. Smooth, flexible, strong films were prepared by casting. These films were unaffected by cold concentrated sulfuric acid, cold aqueous potassium hydroxide and boiling water.

EXAMPLES 2-5

The general procedures of Example 1 were followed. Reaction temperatures of 20° to 200° C. were employed. The heptafluorobutanol was replaced by the appropriate fluoroalcohols. The poly(fluoroalkoxyphosphazene) polymers specified in Examples 2-5 were prepared. For Examples 3 through 5, dioxane or di- or tri-glyme were used as solvents for the alkoxide salt and dioxane/chlorobenzene (1 v./1 v.) was used for the $[Cl_2PN]_n$ polymer. The resulting polymers were insoluble in acetone, tetrahydrofuran, benzene, ethanol, Freon TA and Freon E-2. The polymers became less soluble in Freon E-1 as the carbon content of the fluoroalkoxy group increased.

| Example | Poly(fluoroalkoxyphosphazene) homopolymer | Analysis (percent)* | | | | $[\eta]$ (dl./g.) Freon E-1 at 30° C. |
|---|---|---|---|---|---|---|
| | | C | H | F | Cl | |
| 2 | [(C₄F₉CH₂O)₂PN]ₙ | 22.0 (22.1) | 0.7 (0.7) | 62.7 (63.0) | 0.07 | 2.1 |
| 3 | [(CF₃CF(CF₃)CF₂CH₂O)₂PN]ₙ | 21.8 (22.1) | 0.8 (0.7) | 62.9 (63.0) | 0.10 | 1.7 |
| 4 | [(C₇F₁₅CH₂O)₂PN]ₙ | 22.7 (22.8) | 0.5 (0.5) | 67.5 (67.7) | 0.09 | 1.1 |
| 5 | [(C₁₁F₂₃CH₂O)₂PN]ₙ | 22.9 (23.2) | 0.5 (0.4) | 70.0 (70.3) | 0.12 | 0.8 |

*Theoretical values appear in parentheses.

EXAMPLES 6–7

Preparation of [(CF₃CH₂O)₂PN]ₙ

Following the procedure of Example 1 but replacing the heptafluorobutanol by 2,2,2-trifluoroethanol (0.432 mole) [(CF₃CH₂O)₂PN]ₙ homopolymer was prepared. This polymer had an intrinsic viscosity of 1.5 dl./g. in acetone at 28° C. and was soluble in acetone, tetrahydrofuran and Freon TA.

Preparation of [(C₂F₅CH₂O)₂PN]ₙ

Following the procedure of Example 1 but using 2,2,3,3,3-pentafluoropropanol (0.432 mole), the

[(C₂F₅CH₂O)₂PN]ₙ homopolymer was prepared. The polymer had an intrinsic viscosity of 0.30 dl./g. in Freon TA at 28° C. and contained less than 0.1% chlorine. In marked contrast to the homopolymer of Example 1, this homopolymer was partially soluble in acetone and was completely soluble in Freon TA or Freon E-2.

Examples 6 and 7 exemplify the polymers reported in U.S. Pat. 3,370,020. The [(C₃F₇CH₂O)₂PN]ₙ polymer has been described recently [H. R. Allcock and G. Y. Moore, Macromolecular, 5, 231 (1972)]. However, this polymer, unlike the polymers of this invention, was soluble in Freon TA. The polymers of this invention are characterized by a significantly greater degree of solvent resistance and therefore show greater utility than soluble counterparts.

We claim:
1. Homopolymers which are plastics and which exhibit outstanding stability to common organic solvents and water and which are represented by the general formula:

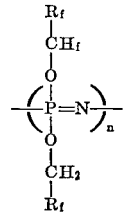

wherein $n$ is a number from about 50 to 50,000 and $R_f$ represents a perfluoroalkyl radical which may be either linear or branched and wherein there are from 4 to 12 carbon atoms in each $R_fCH_2O-$ group and all carbon atoms in the $R_f$ group are fully fluorinated, said homopolymers being soluble in $CF_3C_2F_4OCHFCF_3$ known as Freon E-1.

2. Polymers of Claim 1 wherein $R_f$ is $C_3F_7$.
3. Polymers of Claim 1 wherein $R_f$ is $C_4F_9$.
4. Polymers of Claim 1 wherein $R_f$ is $CF_3CF(CF_3)CF_2$.
5. Polymers of Claim 1 wherein $R_f$ is $C_7F_{15}$.
6. Polymers of Claim 1 wherein $R_f$ is $C_{11}F_{23}$.
7. Films made from the polymers of Claim 1.
8. Coatings including the polymers of Claim 1.

References Cited

UNITED STATES PATENTS

| | | | |
|---|---|---|---|
| 3,271,330 | 9/1966 | Evans | 260—2 P |
| 3,524,907 | 8/1970 | Stockel et al. | 260—2 P |
| 3,515,688 | 6/1970 | Rose | 260—2 P |

WILBERT J. BRIGGS, Sr., Primary Examiner

U.S. Cl. X.R.

117—161 R; 260—33.2 R